United States Patent [19]
Mori

[11] Patent Number: 5,600,496
[45] Date of Patent: Feb. 4, 1997

[54] DEVICE FOR CONTROLLING A ZOOM LENS

[75] Inventor: Shigeru Mori, Tokyo, Japan

[73] Assignee: Sony Corporation, Tokyo, Japan

[21] Appl. No.: 397,647

[22] Filed: Mar. 2, 1995

[30] Foreign Application Priority Data

Mar. 14, 1994 [JP] Japan .................................. 6-042719

[51] Int. Cl.⁶ ...................................................... G02B 7/02
[52] U.S. Cl. ............................................................ 359/820
[58] Field of Search .............................................. 359/820

[56] References Cited

U.S. PATENT DOCUMENTS

| | | | |
|---|---|---|---|
| 3,944,324 | 3/1976 | Tajima et al. | 359/691 |
| 4,885,600 | 12/1989 | Iwasa et al. | 354/400 |
| 4,907,867 | 12/1989 | Perrin et al. | 359/694 |
| 5,124,738 | 6/1992 | Yamashita | 354/402 |

FOREIGN PATENT DOCUMENTS 2141260  12/1984  United Kingdom.

OTHER PUBLICATIONS

Patent Abstracts of Japan, vol. 9, No. 296, Nov. 22, 1985 (Furuya).

Primary Examiner—Georgia Y. Epps
Assistant Examiner—Thomas Robbins
Attorney, Agent, or Firm—Jay H. Maioli

[57] ABSTRACT

A zoom lens device includes an imaging device for converting light from an object to an electrical signal, a zoom lens and a focusing lens disposed between the object and the imaging device, a zooming adjusting circuit for adjusting a movement of the zoom lens, focus adjusting circuits for adjusting movements of the focusing lens, correcting circuits for outputting an adjustment value in response to adjustment of the zoom lens, a temperature detecting circuit for detecting a temperature around the object, and a coefficient circuit for correcting a correction value of the correcting circuit based on an output signal of the temperature detecting circuit.

2 Claims, 4 Drawing Sheets

DEVICE FOR CONTROLLING A ZOOM LENS

BACKGROUND OF THE INVENTION

1. Field of the Invention

The present invention relates to a zoom lens device for use with a video camera of a single-unit video camera-recorder, for example.

2. Description of the Related Art

As zoom lens devices for use with a video camera of a single-unit video camera-recorder, for example, there is available a so-called compensator-less inner-focus lens.

FIG. 1 of the accompanying drawings shows an arrangement of a zoom lens device including a compensator-less inner-focus lens.

In FIG. 1, reference numeral 1 designates a fixed front component. A so-called variator lens 2 for determining a zooming position is disposed behind the fixed front component 1. A focusing lens 5 for properly focusing an object is disposed behind the variator lens 2 succeeded by an iris mechanism 3 and a fixed lens 4. Reference numeral 6 designates an imaging device, i.e., CCD (charge-coupled device).

In the above-mentioned zoom lens device, when the position of the variator lens 2 is moved straight between A (wide-angle lens mode) and B (telephoto lens mode) for effecting so-called zooming, the position of the focusing lens 5 is moved along loci of predetermined curves 30 and 31 in FIG. 1. Thus, the position of the focusing lens 5 is determined so as to properly focus the object constantly when the cameraman takes a picture of the object away from the camera by an arbitrary distance by properly placing the variator lens 2 at an arbitrary position between the wide-angle lens mode (A) and the telephoto lens mode (B). The curve 31 indicates the case where the focusing lens 5 is placed near the object, and the curve 31 indicates the case where the focusing lens 5 is distant from the object.

To determine the position of the focusing lens 5 along the loci of the curves 30 and 31, a microcomputer is used (not shown) including a memory in which data (cam-operation data) of these curves 30, 31 are stored. Data indicating the position of the focusing lens 5 relative to information indicating the position of the variator lens 2 is read out from the memory of the microcomputer. Moreover, data indicating curves relative to several distances composed of distances from the camera to the object, such as shortest distance to longest distance (infinite) are stored in the memory of the microcomputer. For these distances, the microcomputer proportionally divides data indicating several distances to determine the position of the focusing lens 5. Among the related art, are U.S. Pat. Nos. 5,212,593 and 5,352,882 of the same assignee of the present application.

When the above-mentioned zoom lens device is used by the video camera of the single-unit video camera-recorder, if the zoom lens device is mounted within a closed outer casing of the video camera, there is then the risk that a lens barrel and a lens itself are heated due to a source of high temperature because the temperature within the video camera rises due to heat generated from a base plate or the like.

On the other hand, in the zoom lens device, when a temperature change occurs in the circumstance under which the zoom lens device is used, it is frequently observed that a lens focusing position (focusing position) is displaced depending on temperature characteristics of assembly parts which are affected by environment temperature, such as expansion and contraction of a lens barrel material and a change of curvature of the lens itself.

Specifically, in the above-mentioned zoom lens device, when the object is distant from the camera by an arbitrary distance, let it be assumed that a curve along which the position of the focusing lens 5 (vertical axis) is moved relative to the position of the variator lens 2 (horizontal axis) is indicated by a curve a in FIG. 2. Data indicative of the curve a is obtained under arbitrary environment temperature when the zoom lens device is designed and manufactured, and stored in the above-mentioned memory of the microcomputer.

If, on the other hand, the lens barrel material is expanded or contracted and the curvature of the lens itself is changed as the environment temperature is changed, then the curve a is displaced in the horizontal direction to present a curve b in FIG. 2. In this case, if the position of the focusing lens 5 is moved relative to the arbitrary object under the condition that the variator lens 2 is placed at the telephoto lens end, then the arbitrary object is properly focused at the position B in FIG. 2.

If the variator lens 2 were moved from the telephoto lens end to the wide-angle lens side under the condition that the focusing lens 5 is placed at the position B, the position of the focusing lens 5 would have to be shifted as shown by the curve b. However, in the above-mentioned example, the microcomputer proportionally divides data indicative of the curve a obtained in the arbitrary object distance stored in the memory and data indicating a curve a of the next object distance with the result that the position of the focusing lens 5 is shifted as shown by a resultant curve d.

As a result, due to a displacement of vertical axes of the curves d and b, the object of the arbitrary distance is not properly focused. Therefore, when the position (zooming position) of the variator lens 2 is moved from the telephoto lens end to the wide-angle lens side, the object placed with the arbitrary distance object is not properly focused due to the movement of the position of the variator lens 2. When the object is not properly focused, performance of the zoom lens device is lowered. Further, when the zoom lens device is used together with an automatic focus adjustment device, the automatic focus adjustment device has to adjust the displacement of focus instead of the zoom lens device.

Therefore, the focus displacement caused when the object is not properly focused due to the change of the environment temperature has to be corrected. In the zoom lens device, however, the curve a is not only parallelly fluctuated in the vertical and horizontal directions but also is fluctuated variously depending on lens characteristics of individual lenses, such as expansion and contraction of curvature, structure of the lens barrel and power of the lens or the like. Thus, it is very difficult to predict the fluctuation of the curve a, Further, in order to correct the curve a to obtain the curve b, a complex processing is required and such complex processing cannot be realized with ease.

On the other hand, in the video camera of the single-unit video camera-recorder, as a technology for mounting camera assemblies on the video camera with high density is advanced, the video camera of the single-unit video camera-recorder is miniaturized, becomes handier and can be used in a variety of circumstances. Furthermore, performance which the user requests that the machine obtain becomes high. For example, it is requested that the object can be properly focused under any circumstances in which the video camera is used.

SUMMARY OF THE INVENTION

In view of the aforesaid aspect, it is an object of the present invention to provide a zoom lens device in which a focus displacement caused when an object is not properly focused due to a change of an environment temperature can be corrected constantly and satisfactorily.

According to an aspect of the present invention, there is provided a zoom lens device which is comprised of an imaging device 6 for converting light from an object to an electrical signal, a zoom lens and a focusing lens disposed between the object and the imaging device, a zooming adjusting circuit for adjusting a movement of the zoom lens, focus adjusting circuits for adjusting movements of the focusing lens, correcting circuits for outputting an adjustment value in response to adjustment of the zoom lens, a temperature detecting circuit for detecting a temperature around the object, and a coefficient circuit for correcting a correction value of the correcting circuit based on an output signal of the temperature detecting circuit.

According to the zoom lens device of the present invention, it becomes possible to solve the problem that a focus displacement is caused when the object is not properly focused due to the change of environment temperature.

Furthermore, according to the present invention, when the zooming position is moved from the telephoto lens end to the wide-angle lens side, it is possible to solve the problem that a focus displacement is caused when the object is not properly focused due to the movement of the zooming position.

DETAILED DESCRIPTION OF THE PREFERRED EMBODIMENT

The present invention will now be described with reference to the drawings.

Figure 3:
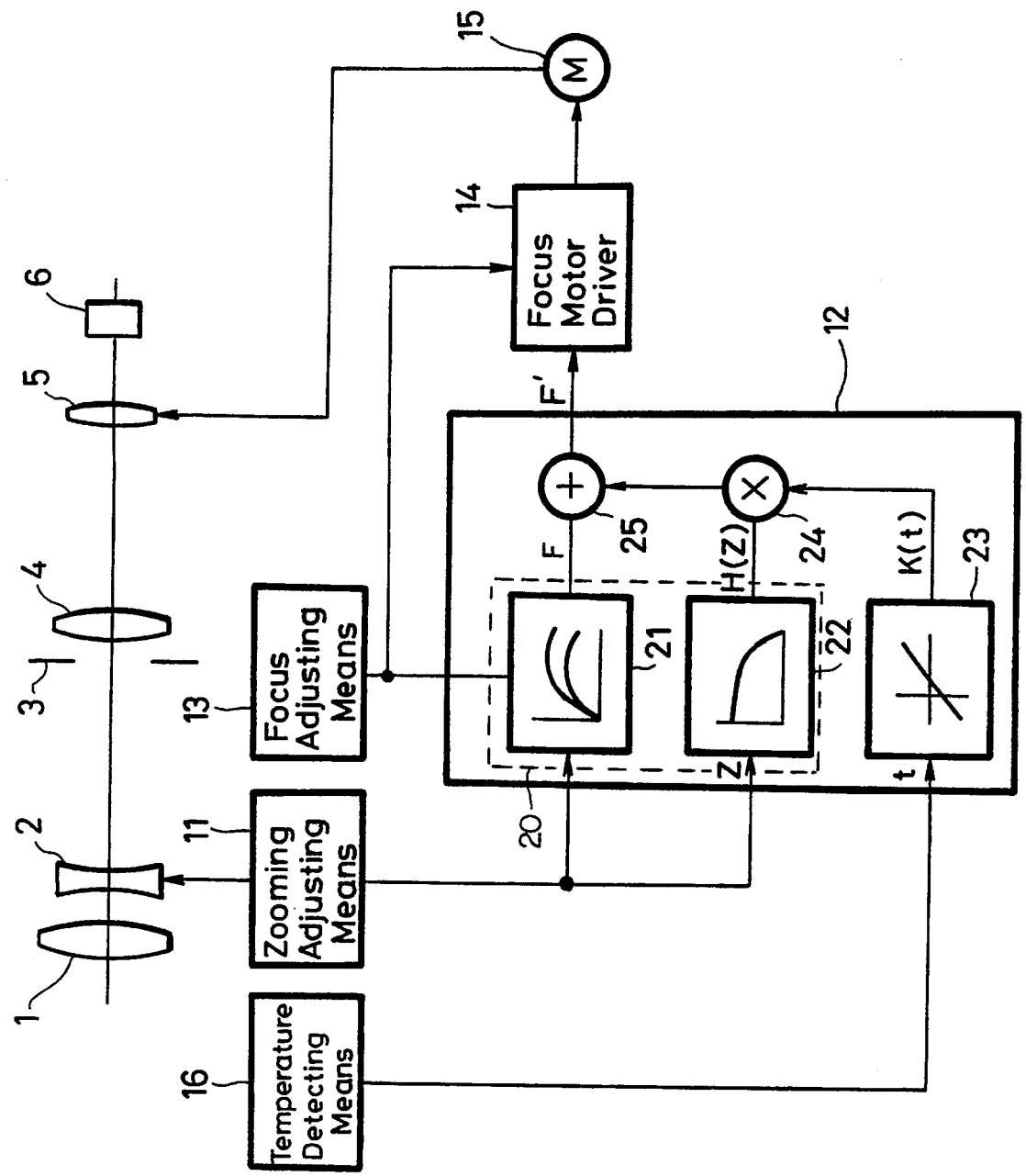
FIG. 3 is a schematic, partly in block form, diagram showing a zoom lens device according to an embodiment of the present invention in which the present invention is applied to a compensator-less inner-focus lens.

FIG. 3 schematically shows, partly in block form, a zoom lens device according to an embodiment of the present invention which is applied to a compensator-less inner-focusing lens. As shown in FIG. 3, a variator lens 2 for determining the zooming position is disposed behind a fixed front component 1. A focusing lens 5 for focusing an object is disposed behind the variator lens 2 succeeded by an iris mechanism 3 and a fixed lens 4. In FIG. 3, reference numeral 6 designates an imaging device (CCD).

When a zooming adjusting means 11 is driven either manually or by an electric power, the variator lens 2 is moved to an arbitrary position. Information indicating an amount with which the variator lens 2 is moved is supplied from the zooming adjusting means 11 to a microcomputer 12.

A signal from a focusing adjusting means 13 is supplied through a focus motor driver 14 to a focus motor (M) 15 to move the position of the focusing lens 5 so that an arbitrary object is properly focused. To this end, the focusing adjusting means 13 generates information indicative of a distance to the arbitrary object. The information indicating the distance to the arbitrary object is supplied to the microcomputer 12 from the focusing adjusting means 13.

The microcomputer 12 includes a memory 20 to store a map 21 in which there are stored data representing focus trace positions of the focusing lens 5 relative to the position of the variator lens 2 in the arbitrary distance of the object.

The microcomputer 12 retrieves the map 21 based on information indicative of a moved amount of the variator lens 2 supplied thereto from the zooming adjusting means 11 and information representing distances up to the arbitrary object supplied thereto from the focusing adjusting means 13 to generate information F indicating the position of the focusing lens 5 to properly focus the arbitrary object.

The position information F is supplied to the focus motor driver 14 through an adding means 25, which will be described later on, so that, when the zooming adjusting means 11 moves the variator lens 2 to an arbitrary position, the focus motor driver 14 receives the position information F from the map 21 and drives the focus motor 15 to move the position of the focusing lens 5 based on the position information F.

The position information F of the focusing lens 5 is obtained at an arbitrary environment temperature when the zoom lens device is designed and manufactured and then stored in the map 21 of the memory 20.

The zoom lens device according to the present invention includes a temperature detecting means 16 for detecting a temperature of the lens barrel and the lens. Based on information indicating the temperature detected by the temperature detecting means 16, it is possible to correct the position information F of the focusing lens 5 stored in the map 21.

Figure 1:
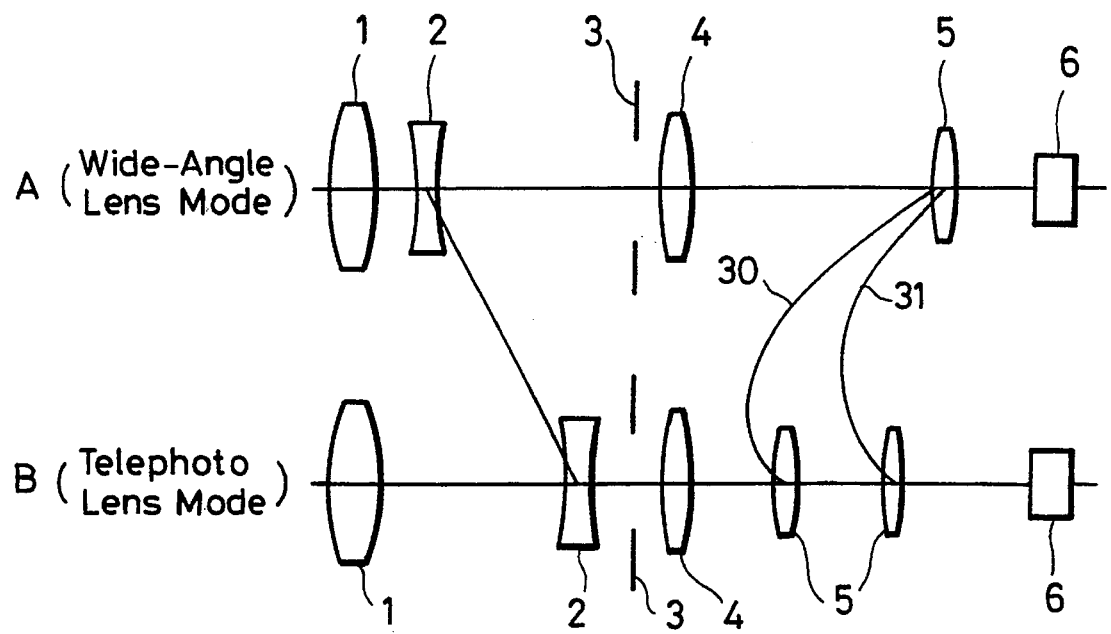
FIG. 1A and 1B are diagrams used to explain a zoom lens device including a compensator-less inner-focus lens according to the related art.
Figure 2:
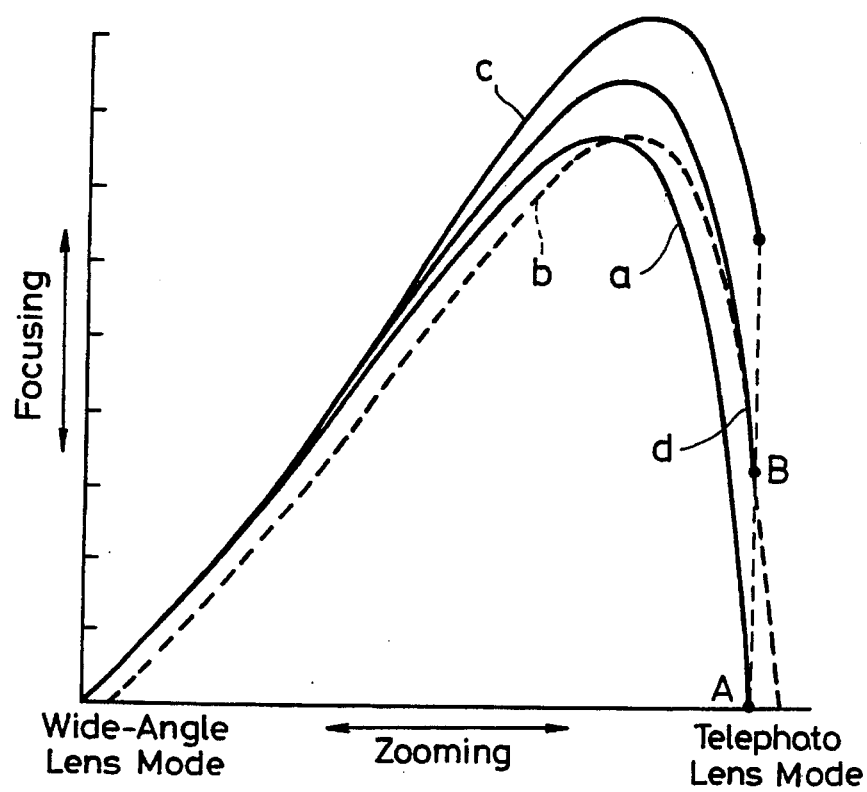
FIG. 2 is a diagram used to explain the state that the focus is displaced with a change of an environment temperature.
Figure 4:
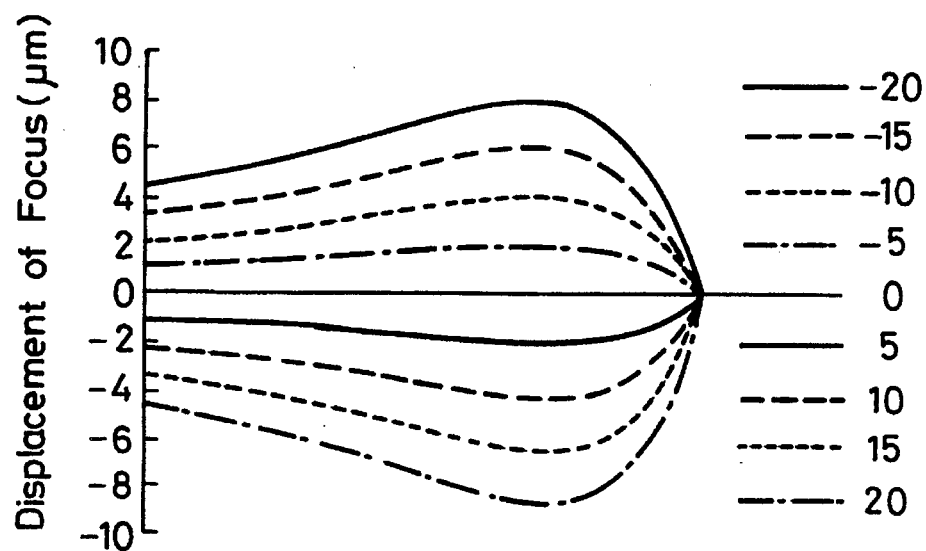
FIG. 4 is a schematic diagram showing an example of focus displacement amount and to which reference will be made in explaining the focus displacement occurring when a curve is displaced only in the horizontal direction due to the change of environment temperature.

In the characteristic represented by the curve a in FIG. 2, the focus displacement (vertical direction difference between the curves b and d) caused only when the curve a is displaced in the horizontal direction due to the change of environment temperature is presented by respective curves in FIG. 4 relative to the amount (ranging from −20 μm to +20 μm at the pitch of 5 μm) in which the lens barrel and the lens are displaced due to the change of environment temperature.

In FIG. 4, the horizontal axis indicates the position of the variator lens 2 and the vertical axis indicates the focus displacement. A central horizontal axis in FIG. 4 indicates a portion in which the environment temperature is not changed at all. In FIG. 4, a right-hand side position at which the respective curves are converged indicates a telephoto lens end of the variator lens 2. Each curve is shaped such that a displacement amount is progressively decreased after it had been temporarily enlarged in the left-hand side (wide-angle lens side) from the position of the telephoto lens end.

Figure 5:
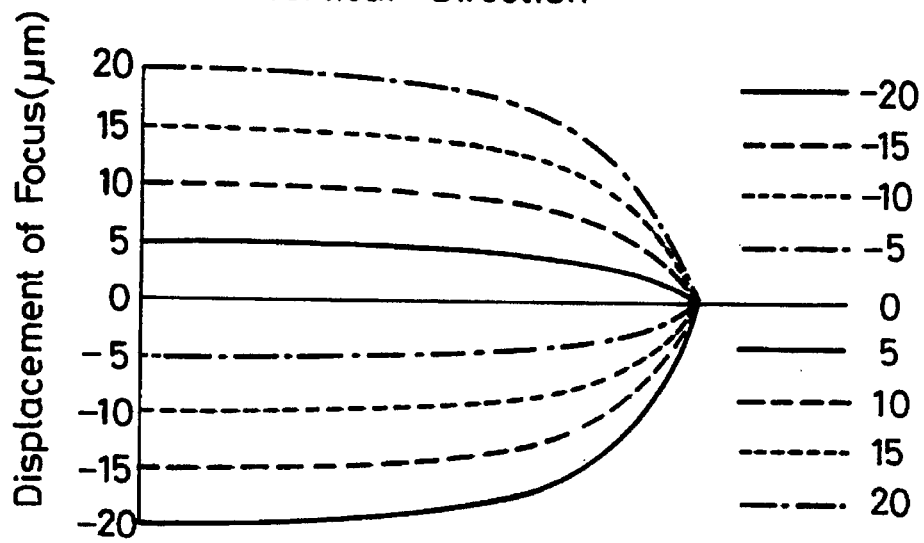
FIG. 5 is a schematic diagram showing an example of focus displacement amount and to which reference will be made in explaining the focus displacement occurring when a curve is displaced only in the vertical direction due to the change of environment temperature.

The focus displacement (vertical direction difference between the curves b and d) caused only when the curve a is displaced only in the vertical direction is presented by curves in FIG. 5 relative to the amount (ranging from −20 μm to +20 μm at the pitch of 5 μm) in which the lens barrel and the lens are displaced by the change of environment temperature.

In FIG. 5, the horizonal axis indicates the position of the variator lens 2 and the vertical axis indicates the focus displacement. The central horizontal axis in FIG. 5 shows a portion in which the environment temperature is not changed at all (zero). A right-hand side position at which the respective curves are converged is the telephoto lens end of the variator lens 2. Each curve is shaped such that the displacement amount is progressively enlarged in a parabolic fashion toward the left-hand side (wide-angle lens side) from the position of the telephoto lens side.

Figure 6:
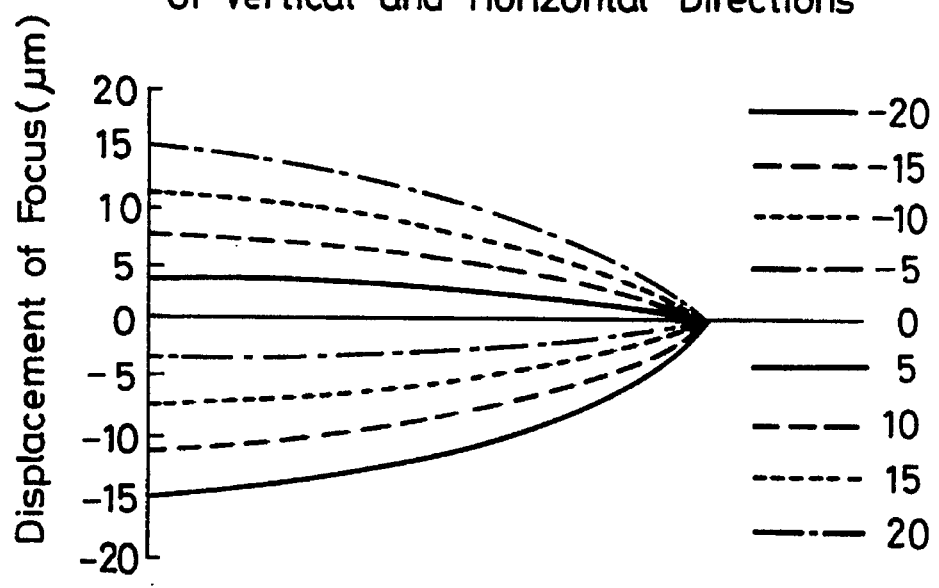
FIG. 6 is a schematic diagram showing an example of focus displacement amount and to which reference will be made in explaining the focus displacement occurring when a curve is displaced in the same directions of the vertical and horizontal directions due to the change of environment temperature.

A focus displacement caused when the curve a is displaced in the same directions of the horizontal and vertical directions is presented by respective curves in FIG. 6 with respect to a displaced amount (ranging from −20 μm to +20 μm at the pitch of 5 μm) of the lens barrel and the lens when the lens barrel and the lens are displaced with the change of the environment temperature.

In FIG. 6, the horizontal axis indicates the position of the variator lens 2 and the vertical axis indicates the displacement of the focus. The central horizontal axis in FIG. 6 indicates a portion in which the environment temperature is not changed at all (zero). A right-hand side position at which the respective curves are converged is the telephoto lens end of the variator lens 2. Each curve is shaped such that the displacement amount is progressively enlarged toward the left-hand side (wide-angle lens side) from the telephoto lens end position.

Figure 7:
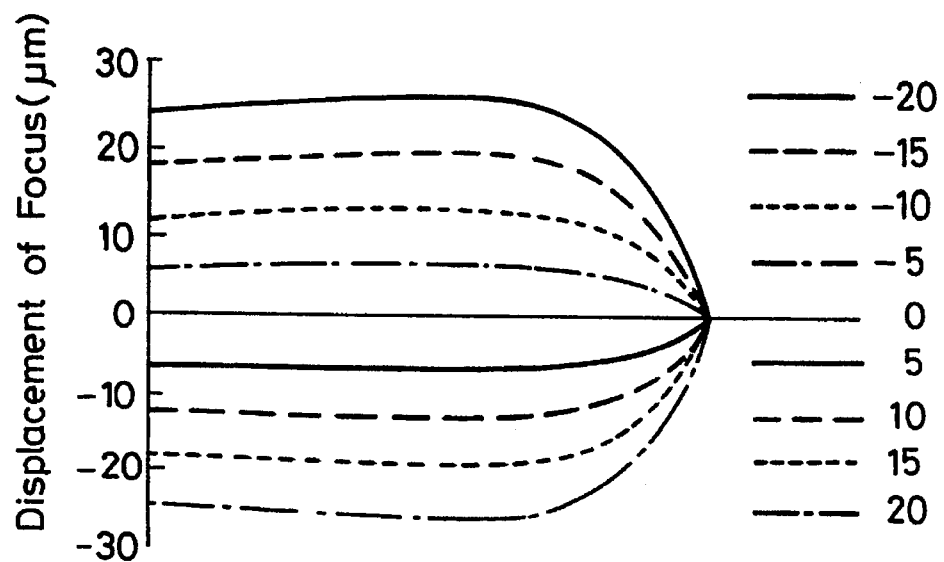
FIG. 7 is a schematic diagram showing an example of focus displacement amount and to which reference will be made in explaining the focus displacement occurring when a curve is displaced in the opposite directions of the vertical and horizontal directions due to the change of environment temperature.

A focus displacement (difference between the curves b and d in the vertical direction) caused when the curve a is shifted in the opposite directions of the horizontal and vertical directions is presented as shown by curves in FIG. 7 with respect to a displacement amount (ranging from −20 μm to +20 μm at the pitch of 5 μm) of the lens barrel and the lens when the lens barrel and the lens are displaced with the change of environment temperature.

In FIG. 7, the horizontal axis indicates the position of the variator lens 2 and the vertical axis indicates the focus displacement. The central horizontal axis in FIG. 7 indicates a position at which the environment temperature is not changed at all (zero). A right-hand side position at which the respective curves are converged is the telephoto lens end of the variator lens 2. Each curve is shaped such that the displacement amount becomes substantially constant after it was temporarily enlarged toward the left-hand side (wide-angle lens side) from the position of the telephoto lens end.

Having studied respective characteristics shown in FIGS. 4 through 7, it is to be noted that, although the respective curves are different in shape, the curves shown in FIGS. 4 through 7 are shaped in proportion to the displacement amount (ranging from −20 μm to +20 μm at the pitch of 5 μm) of the lens barrel and the lens generated when the environment temperature is changed.

In the above-mentioned zoom lens device, information indicating the moved amount of the variator lens 2 from the zooming adjusting means 11 is supplied to a correction map 22 of the microcomputer 12 and thereby a fundamental correction amount H(z) of the focus displacement occurring in accordance with moved amount information (z) is retrieved. Data of the fundamental correction amount H(z) memorized in the correction map 22 is based on data of the respective curves shown in FIGS. 4 through 7 and there are available various data of the fundamental correction amount H(z). The shape of each curve is determined based on the arrangement of the zoom lens device or the like when the zoom lens device is designed or manufactured. The data indicating the fundamental correction amount H(z) thus determined is stored in the memory.

Temperature information (t) detected by the temperature detecting means 16 which detects the temperatures of the lens barrel and the lens is supplied to a map 23 of the microcomputer 12, in which a temperature coefficient K(t) is formed in accordance with an arbitrary function. The thus formed temperature coefficient K(t) and the retrieved fundamental correction amount H(z) are multiplied with each other by a multiplying means 24. A multiplied value from the multiplying means 24 is added to the position information F of the focusing lens 5 supplied thereto from the map 21 by an adding means 25.

Therefore, according to this zoom lens device of the present invention, when the variator lens 2 is moved to the arbitrary position by the zooming adjusting means 11, the position information F from the map 21 is added with the value in which the fundamental correction amount H(z) and the temperature coefficient K(t) are multiplied and thereby corrected. Then, the position information F' thus corrected is supplied from the adding means 25 to the focus motor driver 14 to drive the motor 15 so that the position of the focusing lens 5 is moved based on the position information F' thus generated.

Although the characteristic curves are different in shape depending on the changing conditions of every device, in the same device, the characteristic curves are shaped in proportion to the amount in which the lens barrel and the lens are displaced when the environment temperature is changed. Therefore, if the changing characteristic is represented as the fundamental correction amount H(z) and the multiplied value of the fundamental correction amount H(z) and the temperature coefficient K(t) is added to the position information F' of the focusing lens 5, then it becomes possible to constantly and satisfactorily correct the focus displacement caused when the arbitrary object is not properly focused due to the change of the environment temperature.

The zoom lens device in which the second lens (focusing lens 5) is moved (focus motor driver 14) in the predetermined relationship (map 21) relative to the movement of the first lens (variator lens 2) includes the arbitrary correction map 22 in which the correction amount become zero at the telephoto lens end. The temperature detecting means 16 detects a temperature and the fundamental correction amount is determined from the correction map 22 based on the first lens moved amount (zooming adjustment means 11). Then, the value that results from multiplying (multiplying means 24) the correction amount with the detected temperature coefficient (map 23) is added (adding means 25) to an amount to control the movement of the second lens (focusing lens 5), thereby correcting the focus displacement caused when the environment temperature is changed. Therefore, it is possible to solve the problem that the focus displacement is caused when the arbitrary object is not properly focused when the zooming position is moved from the telephoto lens end to the wide-angle lens side.

Further, in the above-mentioned zoom lens device, the shapes of the curves of the fundamental correction amount H(z) from the correction map are varied depending on individual lenses because not only are the curves parallelly moved in the vertical and horizontal directions, but the curvature is widened or contracted, the arrangement of the lens barrel is changed and the power of lens is changed. Therefore, it is very difficult to predict the correction amount of the focus displacement.

However, in the same zoom lens device, since the characteristic curves are shaped in proportion to the lens barrel and lens displacement amounts generated with the change of the environment temperature, if the changing characteristic is obtained when the zoom lens device is designed or manufactured and the thus obtained changing characteristic is used as the fundamental correction amount H(z), then it becomes possible to predict the correction amount of the focus displacement. Thus, the focus displacement can be corrected with the simple calculation constantly and satisfactorily.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A zoom lens device comprising:

an imaging device for converting light from an object to an electrical signal;

lens means including a zoom lens and a focusing lens disposed between said object and said imaging device;

a zooming adjusting circuit for adjusting a movement of said zoom lens;

correcting circuit means including a first correction circuit, a second correction circuit for outputting adjustment values in response to adjustment of said zoom lens, and a memory in which a correction value prepared for said lens means is stored as respective correction maps, wherein said correction maps include first correction data comprising correction data used when said zoom lens is moved from the position closest to said imaging device and second correction data comprising correction data used when said zoom lens is placed at the end of a wide-angle lens to display said object largest;

a temperature detecting circuit for detecting a temperature around said focusing lens;

a coefficient circuit for correcting at least one adjustment value of said correction circuit based on an output signal of said temperature detecting circuit;

focusing means receiving an output value of said memory added to an output signal of said coefficient circuit to thereby adjust said focusing lens; and arithmetic means wherein a first adjustment value of said coefficient circuit and said output signal of said second correction circuit are multiplied to obtain a multiplied value, the multiplied value is added to a second adjustment value of the coefficient circuit to obtain an added output signal and said focusing lens is controlled in accordance with the added output signal by said focusing means.

2. A zoom lens device according to claim 1, wherein said zoom lens is a concave lens and said focusing lens is a convex lens, said concave lens and said convex lens constituting a compensator-less arrangement.

* * * * *